United States Patent [19]

Inoue

[11] Patent Number: 5,163,503
[45] Date of Patent: Nov. 17, 1992

[54] MULTI-TYPE AIR CONDITIONER WITH DEW FORMATION PROTECTION FUNCTION IN DISTRIBUTION UNIT

[75] Inventor: Tsunetoshi Inoue, Fuji, Japan

[73] Assignee: Kabushiki Kaisha Toshiba, Kawasaki, Japan

[21] Appl. No.: 775,856

[22] Filed: Oct. 15, 1991

[30] Foreign Application Priority Data

Oct. 16, 1990 [JP] Japan .................................. 2-275353

[51] Int. Cl.⁵ .................. F25B 29/00; F25D 21/00
[52] U.S. Cl. ................................ 165/13; 165/22; 165/64; 165/913; 165/921; 62/150; 62/275; 62/291
[58] Field of Search ................ 165/12, 13, 30, 61, 165/63, 64, 22; 62/150, 272, 275, 285, 291

[56] References Cited

U.S. PATENT DOCUMENTS

| | | | |
|---|---|---|---|
| 3,059,446 | 10/1962 | Constantini et al. | 62/150 |
| 4,720,982 | 1/1988 | Shimizu et al. | 165/22 |
| 4,932,220 | 6/1990 | Inoue | 62/228.3 |

FOREIGN PATENT DOCUMENTS

| | | |
|---|---|---|
| 2706968 | 10/1979 | Fed. Rep. of Germany . |
| 63-188424 | 12/1988 | Japan . |
| 2122335 | 1/1984 | United Kingdom . |

Primary Examiner—John K. Ford
Attorney, Agent, or Firm—Cushman, Darby & Cushman

[57] ABSTRACT

An outdoor unit includes at least a compressor and an outdoor heat exchanger coupled to the compressor. Each of a plurality of indoor units includes at least an indoor heat exchanger. A distribution unit couples the outdoor unit in parallel with the plurality of indoor units to constitute respective refrigeration cycles. The distribution unit has a plurality of refrigeration flow regulating members corresponding to the respective refrigeration cycles. A dew formation preventive member acts on the distribution unit to heat air in the distribution unit, thereby suppressing dew formation in the distribution unit.

15 Claims, 4 Drawing Sheets

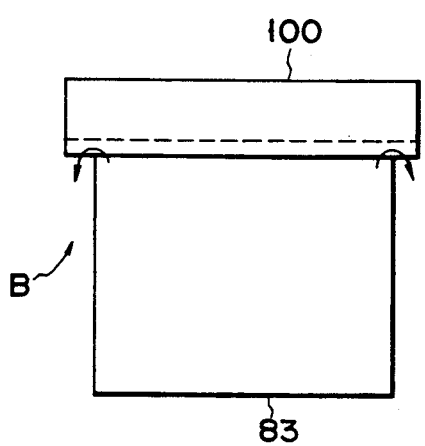
F I G. 4
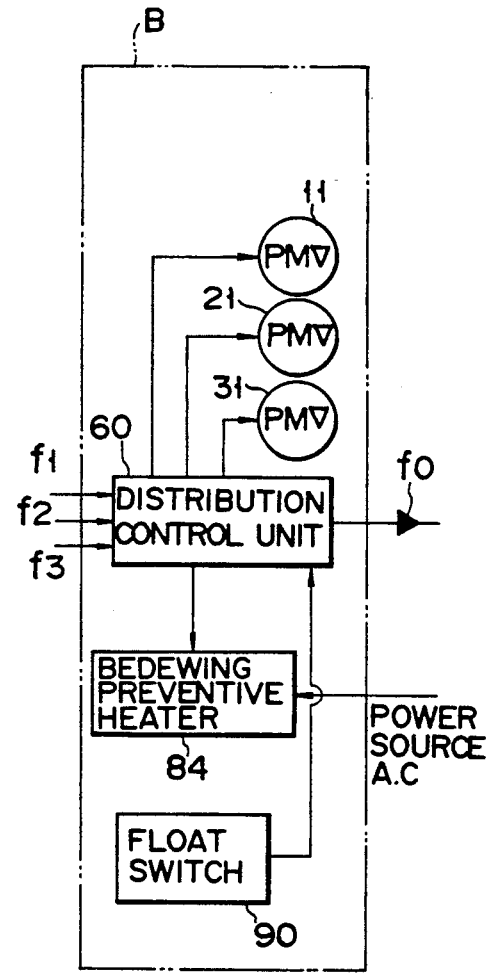
F I G. 5

MULTI-TYPE AIR CONDITIONER WITH DEW FORMATION PROTECTION FUNCTION IN DISTRIBUTION UNIT

BACKGROUND OF THE INVENTION

1. Field of the Invention

The present invention generally relates to a multi-type air conditioner and, more particularly, to a multi-type air conditioner in which a single outdoor unit and a plurality of indoor units are coupled by a distribution unit.

2. Description of the Related Art

A multi-type air conditioner comprising a single outdoor unit and a plurality of indoor units has a coupling distribution unit between the outdoor unit and the indoor units.

The distribution unit incorporates a liquid piping, a gas piping, a header, an electric flow regulating valve (pulse motor valve), an expansion valve, and the like in a metal plate case.

In such a distribution unit, during the cooling operation, a surface temperature of the gas piping which is a low-pressure side is decreased to cause dew formation. The dew drops in the case and is stored as drain water.

Therefore, it is necessary to connect a drain pipe to the case of the distribution unit to discharge the stored drain water to the outside.

However, connection of the drain pipe complicates installation of the air conditioner and increases the cost.

The interior of the distribution unit may be completely filled with a heat-insulating material to prevent dew formation.

However, if the interior of the distribution unit is completely filled with the heat-insulating material, it becomes difficult to appropriately maintain the air conditioner, leading to another problem.

SUMMARY OF THE INVENTION

It is, therefore, an object of the present invention to provide a new and improved multi-type air conditioner which can eliminate storage of drain water in a distribution unit without rendering maintenance difficult, thus making a drain pipe unnecessary, so that installation is simplified and cost is decreased.

According to one aspect of the present invention, there is provided a multi-type air conditioner comprising:

an outdoor unit including at least a compressor and an outdoor heat exchanger coupled to the compressor;

a plurality of indoor units each including at least an indoor heat exchanger;

a distribution unit for coupling the outdoor unit in parallel with the plurality of indoor units to constitute respective refrigeration cycles, the distribution unit having a plurality of refrigeration flow regulating means corresponding to the respective refrigeration cycles; and dew formation preventive means which acts on the distribution unit to heat air in the distribution unit, thereby suppressing dew formation in the distribution unit.

According to another aspect of the present invention, there is provided a multi-type air conditioner comprising:

an outdoor unit including at least a compressor and an outdoor heat exchanger coupled to the compressor;

a plurality of indoor units each including at least an indoor heat exchanger;

a distribution unit for coupling the outdoor unit in parallel with the plurality of indoor units to constitute respective refrigeration cycles, the distribution unit having a plurality of refrigeration flow regulating means corresponding to the respective refrigeration cycles; and dew formation preventive means, including electric heater means which acts on the distribution unit to heat air in the distribution unit and heat-insulating means for heat-insulating a peripheral portion of a piping portion of the distribution unit, thereby suppressing dew formation in the distribution unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 4 shows a water evaporation path of the distribution unit; and

FIG. 5 is a diagram showing the configuration of a control circuit in a modification of the embodiment of FIG. 1.

DETAILED DESCRIPTION OF THE PREFERRED EMBODIMENTS

Figure 1:
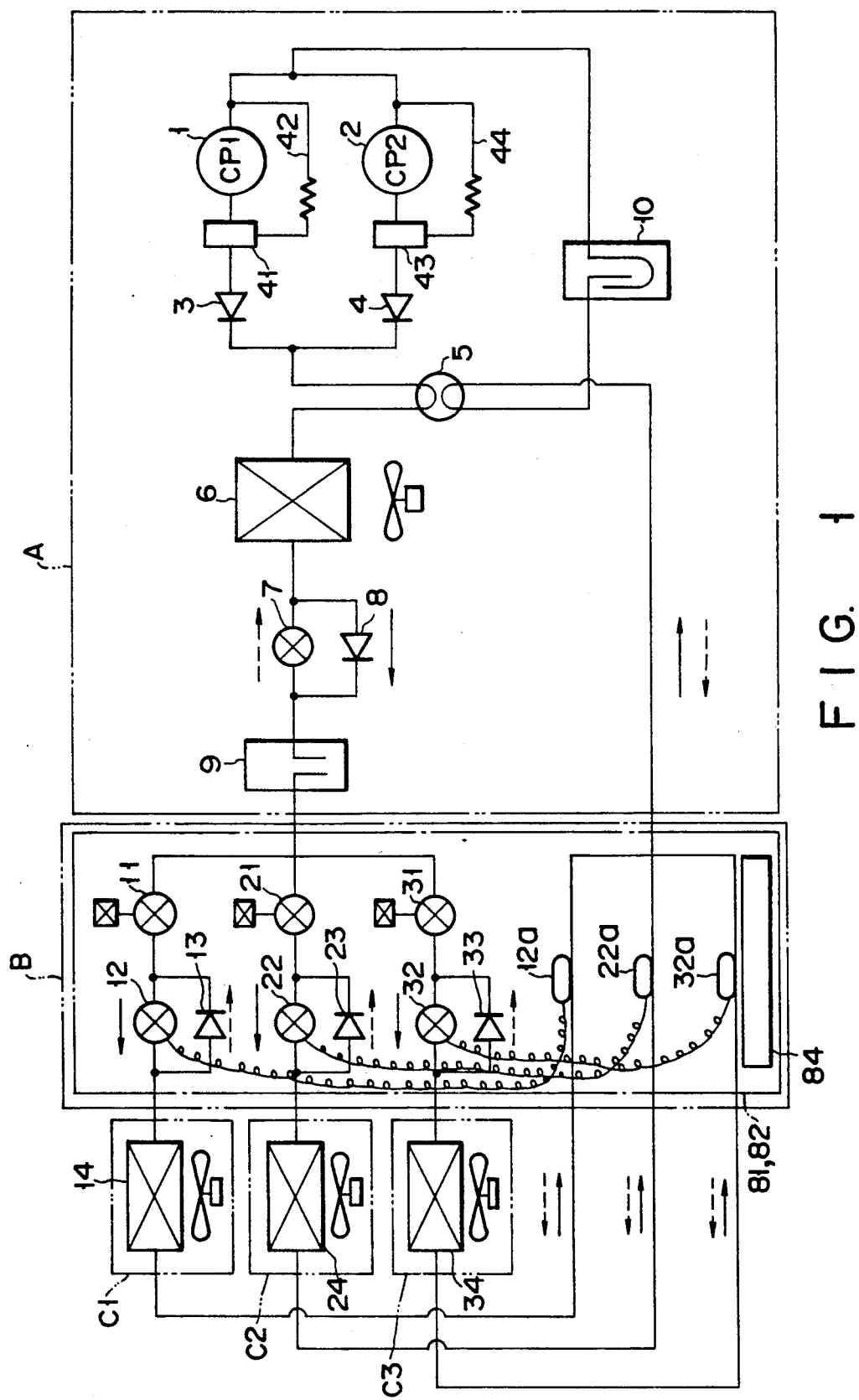
FIG. 1 is a diagram showing the configuration of a refrigeration cycle system of an air conditioner according to an embodiment of the present invention.

Reference will now be made in detail to the presently preferred embodiments of the invention as illustrated in the accompanying drawings, in which like reference characters designate like or corresponding parts throughout the several drawings.

An embodiment of the present invention will be described with reference to the accompanying drawings.

Figure 2:
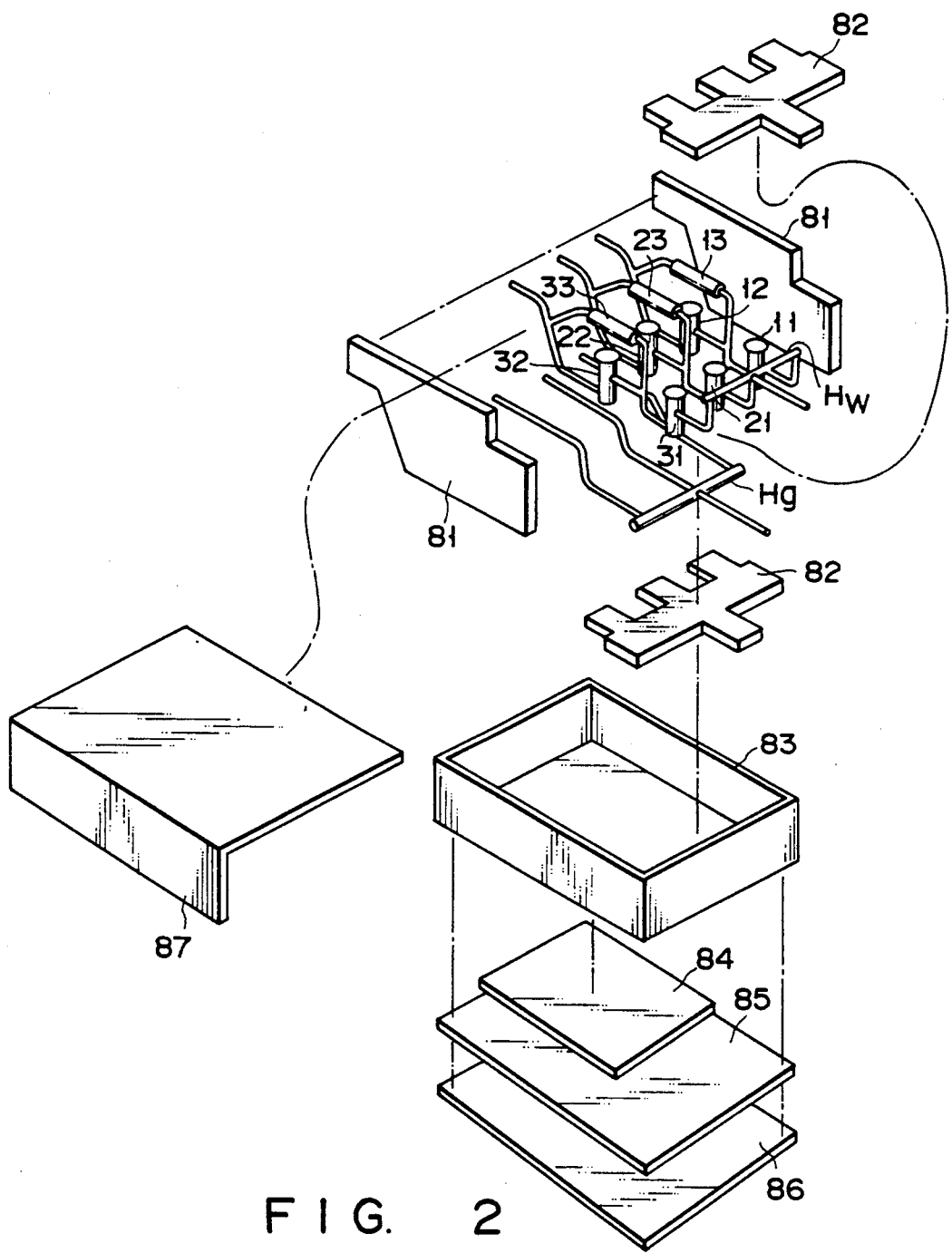
FIG. 2 is an exploded perspective view showing a case of a distribution unit of the embodiment of FIG. 1 and an arrangement of inner pipings.
Figure 3:
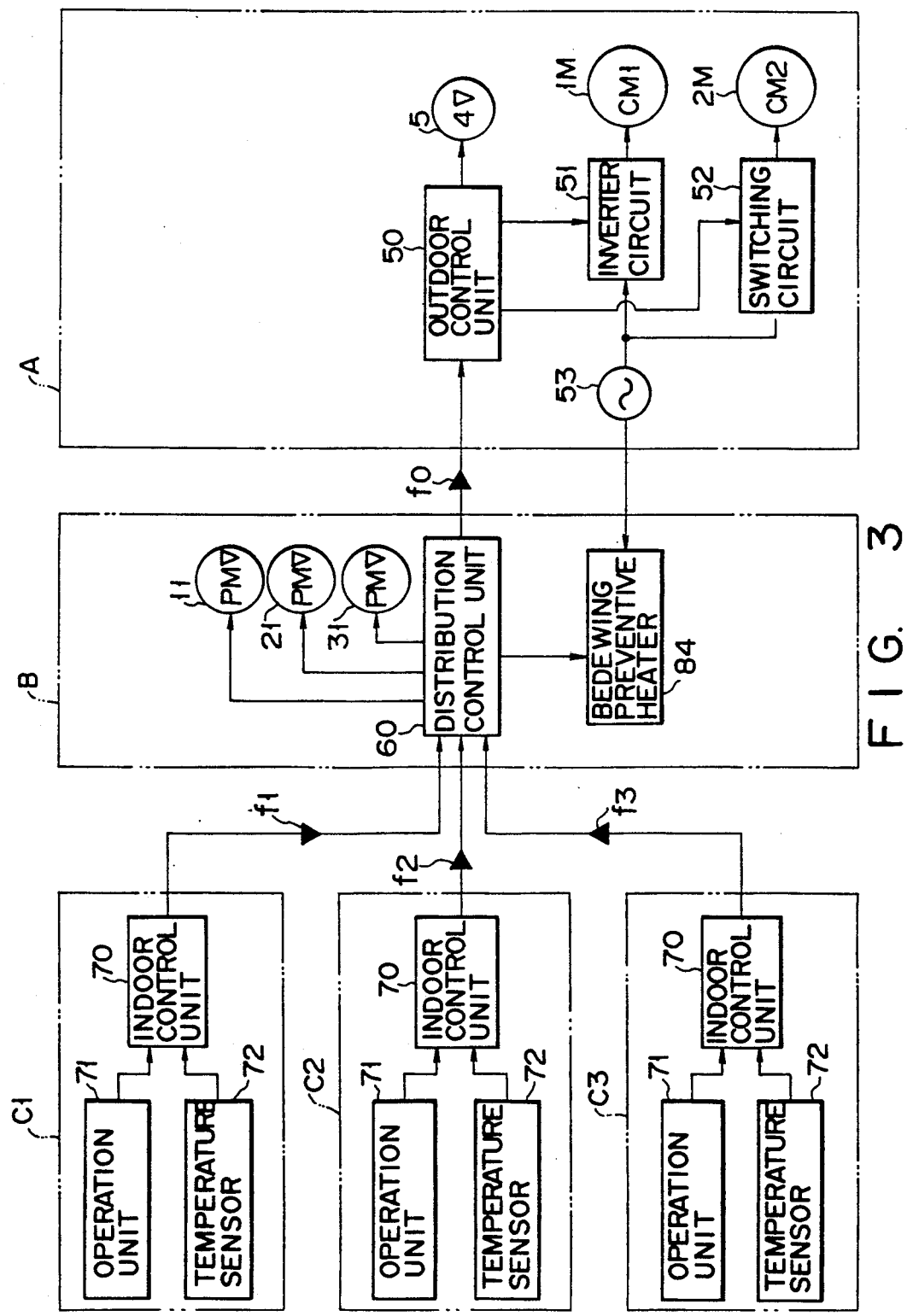
FIG. 3 is a diagram showing the configuration of a control circuit system of the embodiment of FIG. 1.

FIG. 2 is an exploded perspective view of a distribution unit as a major portion of the present invention, FIG. 1 shows a refrigeration cycle system of a multi-type air conditioner in which the distribution unit is incorporated, and FIG. 3 shows an electrical control circuit system of the multi-type air conditioner.

The refrigeration cycle system will be described first. Referring to FIG. 1, a reference symbol A denotes an outdoor unit. The outdoor unit A is connected to a distribution unit B, and the distribution unit B is connected to a plurality of indoor units $C_1$, $C_2$, and $C_3$. These units constitute a refrigeration cycle system as follows.

The outdoor unit A has a variable compressor 1 driven by an inverter and a (constant capacity type) compressor 2 driven by a commercial power supply.

An outdoor heat exchanger 6 is connected to discharge ports of the compressor 1 and 2 through check valves 3 and 4 and a four-way valve 5.

The outdoor heat exchanger 6 is connected to an indoor heat exchanger 14 through a parallel circuit of a heating expansion valve 7 and a cooling cycle check valve 8, a liquid tank 9, and a parallel circuit of an electric flow regulating valve (pulse motor valve; to be abbreviated to as a PMV hereinafter) 11, a cooling expansion valve 12, and a heating cycle check valve 13. The outdoor heat exchanger 6 is also connected to an indoor heat exchanger 24 through the parallel circuit of the heating expansion valve 7 and the cooling cycle check valve 8, the liquid tank 9, and a parallel circuit of a PMV 21, a cooling expansion valve 22, and a heating cycle check valve 23. The outdoor heat exchanger 6 is also connected to an indoor heat exchanger 34 through the parallel circuit of the heating expansion valve 7 and the cooling cycle check valve 8, the liquid tank 9, and a parallel circuit of a PMV 31, a cooling expansion valve 32, and a heating cycle check valve 33. Each of the indoor heat exchangers 14, 24, and 34 is connected to suction ports of the compressors 1 and 2 through the four-way valve 5 and an accumulator 10.

That is, the above connection constitutes a heat pump type refrigeration cycle. During the cooling operation, a refrigerant flows in a direction of a solid line in FIG. 1 to constitute the cooling cycle. During the heating operation, the four-way valve 5 is switched to flow the refrigerant in a direction of a broken line in FIG. 1 to constitute the heating cycle.

The cooling expansion valves 12, 22, and 32 have temperature-sensitive cylinders 12a, 22a, and 32a, respectively. These temperature-sensitive cylinders 12a, 22a, and 32a are connected to gas pipings communicating with the indoor heat exchangers 14, 24, and 34, respectively.

An oil separator 41 is provided to a discharge piping between the discharge port of the compressor 1 and the check valve 3. An oil bypass 42 is provided between the oil separator 41 and a suction piping of the compressor 1.

An oil separator 43 is provided to a discharge piping between the discharge port of the compressor 2 and the check valve 4. An oil bypass 44 is provided between the oil separator 43 and a suction piping of the compressor 2.

Heat-insulating members 81 and 82, and a dew formation preventive heater 84, each of which will be described later, are provided in the distribution unit B.

The arrangements of the internal pipings and the dew formation preventive heater 84 housed in the case of the distribution unit B will be described with reference to FIG. 2.

That is, in the space in a case 83 of the distribution unit B, a liquid header Hw is present in its upper portion, and a gas header Hg is present in its lower portion. Three liquid pipings communicate with the liquid header Hw, and the electric flow regulating valve 11, 21, or 31, the cooling expansion valve 12, 22, or 32, and the check valve 13, 23, or 33 are provided to each liquid piping. Three gas pipings communicate with the gas header Hw.

The heat-insulating members 81 are provided to horizontally sandwich the liquid header Hw and the three liquid pipings communicating with it.

The heat-insulating members 82 are provided to vertically sandwich the gas header Hg and the three liquid pipings communicating with it.

The heat-insulating members 81 and 82 are, e.g., heat-resistant foamed polyethylene.

Reference numeral 83 denotes a case. A press plate 86 is mounted on the lower surface of the bottom plate of the case 83 through the dew formation preventive heater 84 and a heat-insulating plate 85.

The dew formation preventive heater 84 incorporates an electric surface heater. The dew formation preventive heater 84 serves as a means for suppressing generation of dew in the case 83 and evaporating water generated by dew formation by warming air in the unit B as a whole through the bottom plate of the case 83.

The dew formation preventive heater 84 has a capacity capable of increasing the air temperature in the distribution unit B to be higher than an ambient temperature by at least 3 deg (° C.). A temperature increase of 3 deg (° C.) can cause a decrease in relative humidity in the distribution unit B by 10 to 15%.

The upper surface of the case 83 is open. A top plate 87 is provided to this opening to cover this opening.

The control circuit system will be described with reference to FIG. 3.

The outdoor unit A has an outdoor control unit 50 comprising a microcomputer and its peripheral circuit. The outdoor control unit 50 is connected to the four-way valve 5, an inverter circuit 51, and a switching circuit 52.

The inverter circuit 51 rectifies a voltage of a commercial AC power supply 53, converts it to an AC voltage of a predetermined frequency (and level) in accordance with a command from the outdoor control unit 50, and supplies it to a compressor motor 1M as a drive power.

The switching circuit 52 uses, e.g., an electromagnetic contact and controls supply of the drive voltage from the commercial AC power supply 53 to a compressor motor 2M in accordance with a command from the outdoor control unit 50.

The distribution unit B has a distribution control unit 60 comprising a microcomputer and its peripheral circuits.

The distribution control unit 60 is connected to PMVs 11, 21, and 31, and the dew formation preventive heater 84. In practice, the distribution control unit 60 controls supply of the AC power from the commercial AC power supply 53 to the dew formation preventive heater 84.

Each of the indoor units $C_1$, $C_2$, and $C_3$ has an indoor control unit 70 comprising a microcomputer and its peripheral circuits. Each indoor control unit 70 is connected to a corresponding operation unit 71 and a corresponding indoor temperature sensor 72.

The outdoor control unit 50 is connected to the distribution control unit 60 through a signal line, and the distribution control unit 60 is connected to the indoor control units 70 through signal lines.

Each indoor control unit 70 has the following functions:

① a function to send operational conditions set by the operation unit 71 to the distribution control unit 60;

② a function to obtain a difference between an indoor set temperature, among the operational conditions set by the operation unit 71, and a detection temperature detected by the indoor temperature sensor 72 as an air conditioning load; and (3) a function to send a requested capacity corresponding to the obtained air conditioning load to the distribution control unit 61 as a frequency set signal $f_1$, $f_2$, or $f_3$.

The distribution control unit 60 has the following functions:

(1) a function to transfer the given operational conditions to the outdoor control unit 50;

(2) a function to obtain the requested capacities of the indoor units $C_1$, $C_2$, and $C_3$ from the given frequency set signals $f_1$, $f_2$, and $f_3$;

(3) a function to control opening degrees of the PMVs 11, 21, and 31 in accordance with the obtained corresponding requested capacities;

(4) a function to send the sum of the obtained requested capacities to the outdoor unit A as a frequency set signal $f_0$; and (5) a function to control power supply to the dew formation preventive heater 84 during the cooling operation (including an interrupt based on indoor temperature control).

The outdoor control unit 50 has the following functions:

(1) a function to control the four-way valve 5 in accordance with an operation mode among the given operational conditions; and (2) a function to control the number of compressors to be operated of the compressors 1 and 2 and an operating frequency F (=output frequency of the inverter circuit 51) of the compressor 1 in accordance with the given frequency set signal $f_0$.

The operation of the air conditioner having the above configuration will be described.

Assume that all the indoor units perform the cooling operation.

In this case, the indoor control unit 70 of the indoor unit $C_1$ calculates a difference between a detection temperature detected by the corresponding indoor temperature sensor 72 and the set temperature set by the corresponding operation unit 71, and sends the frequency set signal $f_1$ corresponding to the temperature difference to the distribution unit 60 as the requested cooling capacity.

Similarly, the indoor control units 70 of the indoor units $C_2$ and $C_3$ send the frequency set signals $f_1$ and $f_2$ to the distribution control unit 60 as the requested cooling capacities.

The distribution control unit 60 calculates the requested cooling capacities of the respective indoor units on the basis of the transferred frequency set signals and transfers the frequency set signal $f_0$ corresponding to the sum of the requested cooling capacities to the outdoor control unit 50.

The outdoor control unit 50 controls the number of compressors to be operated of the compressors 1 and 2 and the operating frequency F of the compressor 1 on the basis of the transferred frequency set signal $f_0$. That is, as the sum of the requested cooling capacities is increased, the operation is shifted from the single operation by the compressor 1 to the double operation by both the compressors 1 and 2.

The distribution control unit 60 controls the opening degrees of the PMVs 11, 21, and 31 in accordance with the requested cooling capacities of the corresponding indoor units $C_1$, $C_2$, and $C_3$ and regulates flow amounts of the refrigerant to the indoor heat exchangers 14, 24, and 34.

In this case, the cooling expansion valves 12, 22, and 32 automatically change their opening degrees such that the differences between the temperatures of the refrigerant flowing therein and the sensed temperatures sensed by the corresponding temperature-sensitive cylinders 12a, 22a, and 32a, respectively, become a predetermined value, thereby maintaining each of the refrigeration superheating degrees of the outdoor heat exchangers 14, 24, and 34 at a predetermined value, respectively.

In the heating operation, the refrigeration flows in the opposite direction, and similar capacity control to this is performed.

During the cooling operation, the gas piping in the distribution unit B becomes the low-pressure side. The surface temperature of the gas piping is decreased, and dew formation nearly occurs.

During the cooling operation, however, the distribution control unit 60 controls power supply to the dew formation preventive heater 84 and causes it to generate heat.

When the dew formation preventive heater 84 generates heat, air in the distribution unit B is entirely heated, and the relative humidity in the distribution unit B is decreased.

When the relative humidity is decreased, the amount of dew generated on the surface of the piping is decreased.

The surface temperature of the piping is decreased because of the heat-insulating operation of the heat-insulating members 81 and 82, and the amount of dew is further decreased.

The generated dew is quickly evaporated as air is heated. Even if the dew becomes drain water and drops in the case 83, it is quickly evaporated as the temperature of the bottom plate of the case 83 is high.

As shown in FIG. 4, the evaporation path is provided such that water can be evaporated through, e.g., a gap formed at an engaging portion between an electric box 100, which houses the electric circuits of the distribution unit B, and the case 84 to the outer air outside the unit B, as indicated by arrows in FIG. 4.

Therefore, storage of drain water in the distribution unit B can be eliminated, and no drain pipe need be provided to the distribution unit B.

When the drain pipe becomes unnecessary, installation is simplified, and cost is decreased.

The interior of the distribution unit B need not be completely filled with a heat-insulating material as an anti-dew formation measurement, thus avoiding degradation in maintenance easiness.

In the above embodiment, control of power supply to the dew formation preventive heater 84 is performed subsequently to the cooling operation. However, a float switch 90 shown in FIG. 5 may be employed so that power is supplied only when a predetermined amount of drain water is stored in the case 83.

That is, the float switch 90 is connected to the distribution control unit 60. The float switch 90 is turned on when the drain water amount in the case 83 of the distribution unit B exceeds a predetermined value. In this manner, the distribution control unit 60 is imparted with a function to control power supply to the dew formation preventive heater 84 when the float switch 90 is turned on.

Power may be supplied to the dew formation preventive heater 84 periodically based on timer counting.

The dew formation preventive heater 84 is provided on the lower surface of the bottom plate of the case 83. However, it can be provided at any other portion as far as it can heat air in the distribution unit B. The heating means is not limited to the dew formation preventive means 84, and any other means may be employed as far as it can heat air in the distribution unit B.

As has been described above, the air conditioner according to the present invention has the outdoor unit including the compressors and the outdoor heat exchanger, and the plurality of indoor units connected to the outdoor unit through the distribution unit and each including the indoor heat exchanger. The compressors, the outdoor heat exchanger, and the respective indoor heat exchangers are connected to constitute the refrigeration cycle. The air conditioner has a means for heating air in the distribution unit. Therefore, storage of drain water in the distribution unit can be eliminated without degrading the maintenance easiness. As a result, no drain pipe is necessary, and installation can be simplified and cost can be decreased.

According to another aspect of the present invention, the air conditioner has the outdoor unit including the compressors and the outdoor heat exchanger, and the plurality of indoor units connected to the outdoor unit through the distribution unit and each including the indoor heat exchanger. The compressors, the outdoor heat exchanger, and the respective indoor heat exchangers are connected to constitute the refrigeration cycle. The air conditioner has a means for heating air in the distribution unit and the heat-insulating members provided around the pipings in the distribution unit. Therefore, storage of drain water in the distribution unit can be eliminated more effectively without degrading the maintenance easiness. As a result, no drain pipe is necessary, and installation can be simplified and cost can be decreased.

That is, in the former air conditioner, air in the distribution unit is heated, and the relative humidity in the distribution unit is decreased, so that the amount of dew generated on the surface of the piping is decreased. In addition, even if dew is generated, it is quickly evaporated as air is heated.

In the latter air conditioner, air in the distribution unit is heated, and the relative humidity in the distribution unit is decreased, so that the amount of dew generated on the surface of the piping is decreased. In addition, the surface temperature of the piping is increased because of the heat-insulating function of the heat-insulating members, further decreasing the amount of dew. Even if dew is generated, it is evaporated more quickly as air is heated to a higher temperature.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A multi-type air conditioner comprising:
   an outdoor unit including at least one compressor and an outdoor heat exchanger coupled to said compressor;
   a plurality of indoor units each including at least one indoor heat exchanger;
   a distribution unit having means for coupling said outdoor unit in parallel with said plurality of indoor units to constitute respective refrigeration cycles, said distribution unit having a plurality of refrigerant flow regulating means corresponding to said respective refrigeration cycles; and
   dew formation preventive means which act on said distribution unit to heat air in said distribution unit for suppressing dew formation in said distribution unit, said dew formation preventive means including an electric heater means for heating air in said distribution unit, said heater means including a surface heater arranged on a lower portion of said distribution unit, said surface heater including a heater being capable of performing planar heating.

2. A conditioner according to claim 1, wherein said dew formation preventive means includes heat-insulating means provided to a predetermined portion in said distribution unit.

3. A conditioner according to claim 1, wherein said electric heater means is continuously energized during refrigeration operations of said respective refrigeration cycles.

4. A conditioner according to claim 1, wherein said electric heater means has a capacity capable of increasing an air temperature in said distribution unit to be higher than an ambient temperature by a predetermined value.

5. A conditioner according to claim 4, wherein the predetermined value is at least 3° C.

6. A conditioner according to claim 1, wherein said dew formation preventive means includes means for a detecting a drain water amount in said distribution unit, and said detecting means controls power supply to said electric heater means when said detecting means detects a drain water amount exceeding a predetermined value.

7. A conditioner according to claim 6, wherein said detecting means includes a float switch which is turned on when the drain water amount in said distribution unit exceeds the predetermined value.

8. A conditioner according to claim 1, wherein said electric heater means is arranged on a lower side of a bottom plate of a case that houses said distribution unit.

9. A multi-type air conditioner comprising:
   an outdoor unit including at least one compressor and an outdoor heat exchanger coupled to said compressor;
   a plurality of indoor units each including at least one indoor heat exchanger;
   a distribution unit having means for coupling said outdoor unit in parallel with said plurality of indoor units to constitute respective refrigeration cycles, said distribution unit having a plurality of refrigerant flow regulating means corresponding to said respective refrigeration cycles; and
   dew formation preventive means for suppressing dew formation in said distribution unit, said dew formation preventive means including electric heater means which acts on said distribution unit for heating air in said distribution unit and means for heat-insulating a peripheral portion of a piping portion of said distribution unit, said electric heater means including a surface heater arranged on a lower portion of said distribution unit, said surface heater including a heater being capable of performing planar heating.

10. A conditioner according to claim 9, wherein said electric heater means is continuously energized during refrigeration operations of said respective refrigeration cycles.

11. A conditioner according to claim 9, wherein said electric heater means has a capacity capable of increasing an air temperature in said distribution unit to be higher than an ambient temperature by a predetermined value.

12. A conditioner according to claim 11, wherein the predetermined value is at least 3° C.

13. A conditioner according to claim 9, wherein said dew formation preventive means includes means for a detecting a drain water amount in said distribution unit, and said detecting means controls power supply to said electric heater means when said detecting means detects a drain water amount exceeding a predetermined value.

14. A conditioner according to claim 13, wherein said detecting means includes a float switch which is turned on when the drain water amount in said distribution unit exceeds the predetermined value.

15. A conditioner according to claim 9, wherein said electric heater means is arranged on a lower side of a bottom plate of a case that houses said distribution unit.

* * * * *